(12) United States Patent
Chao et al.

(10) Patent No.: US 12,169,495 B2
(45) Date of Patent: Dec. 17, 2024

(54) INCREASED EFFICIENCY OF QUERY TYPES OF REPRESENTATIONAL STATE TRANSFER PROGRAMMING INTERFACES

(71) Applicant: Dell Products L.P., Round Rock, TX (US)

(72) Inventors: Ching-Yun Chao, Austin, TX (US); Steve Petrucci, Bellevue, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/047,879

(22) Filed: Oct. 19, 2022

(65) Prior Publication Data

US 2024/0134862 A1    Apr. 25, 2024
US 2024/0232203 A9    Jul. 11, 2024

(51) Int. Cl.
*G06F 16/00* (2019.01)
*G06F 16/242* (2019.01)
*G06F 16/2455* (2019.01)
*H04L 67/02* (2022.01)

(52) U.S. Cl.
CPC ...... *G06F 16/2456* (2019.01); *G06F 16/2443* (2019.01); *H04L 67/02* (2013.01)

(58) Field of Classification Search
None
See application file for complete search history.

(56) References Cited

U.S. PATENT DOCUMENTS

| | | | | |
|---|---|---|---|---|
| 10,776,163 | B1 * | 9/2020 | Harris | G06F 9/5011 |
| 2017/0339252 | A1 * | 11/2017 | Hamill | H04L 67/02 |
| 2017/0374154 | A1 * | 12/2017 | Hamill | H04L 67/125 |
| 2022/0052962 | A1 * | 2/2022 | Tang | H04L 47/782 |

OTHER PUBLICATIONS

"Google Cloud Resource Hierarchy," Resource Manager, Google Cloud. [https://cloud.google.com/resource-manager/docs/cloud-platform-resource-hierarchy], retrieved Dec. 4, 2023, 11 pages.

(Continued)

*Primary Examiner* — Bai D Vu
(74) *Attorney, Agent, or Firm* — Amin, Turocy & Watson, LLP

(57) ABSTRACT

A system can receive, from a device, a first request according to a representational state transfer protocol, wherein the first request identifies a uniform resource locator to a resource. The system can determine a group of identifiers that are related to the resource, based on a group of nested join operations, based on the first request and without reference to another request, and wherein respective identifiers of the group of identifiers comprise respective uniform resource locators to the respective identifiers. The system can generate a query response that comprises the group of identifiers, and send a message to the device according to the representational state transfer protocol, wherein the message comprises the query response. The system can receive, from the device, a second request that indicates executing a stored procedure that corresponds to a first identifier of the group of identifiers, and execute the stored procedure.

20 Claims, 11 Drawing Sheets

(56) References Cited

OTHER PUBLICATIONS

"Sales Cloud Data Model" Salesforce Architects. [https://architect.salesforce.com/diagrams/template-gallery/sales-cloud-overview-data-model], Apr. 2022, 2 pages.
"Introduction to GraphQL," GraphQL Foundation. [https://graphql.org/learn/], retrieved Dec. 4, 2023, 3 pages.
"GraphQL," Wikipedia. [https://en.wikipedia.org/wiki/GraphQL], retrieved Dec. 4, 2023, 5 pages.
Pandya, Dhaivat. "GraphQL Concepts Visualized," Apollo Blog. [https://www.apollographql.com/blog/graphql/basics/the-concepts-of-graphql/], Aug. 18, 2016, last updated May 19, 2021, 17 pages.
"Salesforce Object Query Language (SOQL)," SOQL and SOSL Reference, Salesforce Documentation. [https://developer.salesforce.com/docs/atlas.en-us.234.0.soql_sosl.meta/soql_sosl/sforce_api_calls_soql.htm], retrieved Dec. 4, 2023, 2 pages.
"Query," REST API Developer Guide, Salesforce Documentation. [https://developer.salesforce.com/docs/atlas.en-us.234.0.api_rest.meta/api_rest/resources_query.htm], retrieved Dec. 4, 2023, 3 pages.
"Cloud Resource Manager API," REST API reference for Resource Manager, Resource Manager, Google Cloud. [https://cloud.google.com/resource-manager/reference/rest], retrieved Dec. 4, 2023, 22 pages.
"HATEOAS" Wikipedia. [https://en.wikipedia.org/wiki/HATEOAS], retrieved Dec. 4, 2023, 3 pages.
Thijssen, Joshua. "What is HATEOAS and why is it important for my REST API?", REST CookBook, Oct. 29, 2016. [https://restcookbook.com/Basics/hateoas/], retrieved Dec. 4, 2023, 2 pages.

\* cited by examiner

900

(902)

↓

RECEIVING A FIRST QUERY REQUEST THAT IDENTIFIES A UNIFORM RESOURCE LOCATOR TO A RESOURCE 904

↓

DETERMINING A GROUP OF IDENTIFIERS THAT ARE RELATED TO THE RESOURCE, WHEREIN THE DETERMINING IS PERFORMED BASED ON A GROUP OF JOIN OPERATIONS ON A GROUP OF DATABASES, WHEREIN THE DETERMINING IS PERFORMED BASED ON THE QUERY REQUEST AND WITHOUT REFERENCE TO ANOTHER QUERY REQUEST, WHEREIN RESPECTIVE IDENTIFIERS OF THE GROUP OF IDENTIFIERS COMPRISE RESPECTIVE UNIFORM RESOURCE LOCATORS TO THE RESPECTIVE IDENTIFIERS, AND WHEREIN THE RESPECTIVE UNIFORM RESOURCE LOCATORS ARE CONSISTENT ACROSS RESOURCE TYPES AND QUERY REQUESTS 906

↓

GENERATING A QUERY RESPONSE THAT COMPRISES THE GROUP OF IDENTIFIERS 908

↓

SENDING THE QUERY RESPONSE TO THE DEVICE 910

↓

IN RESPONSE TO RECEIVING A SECOND QUERY REQUEST THAT INDICATES EXECUTING A STORED PROCEDURE THAT CORRESPONDS TO A FIRST IDENTIFIER OF THE GROUP OF IDENTIFIERS, EXECUTING THE STORED PROCEDURE 912

INCREASED EFFICIENCY OF QUERY TYPES OF REPRESENTATIONAL STATE TRANSFER PROGRAMMING INTERFACES

BACKGROUND

A representational state transfer (REST) application programming interface (API) can be implemented that responds to REST query requests with configuration data for a resource.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, from a device, a first request according to a representational state transfer protocol, wherein the first request identifies a uniform resource locator to a resource. The system can determine a group of identifiers that are related to the resource, wherein the determining is performed based on a group of nested join operations on a group of database tables, wherein the determining is performed based on the first request and without reference to another request, wherein respective identifiers of the group of identifiers comprise respective uniform resource locators to the respective identifiers, and wherein the respective uniform resource locators are consistent across resource types and query requests. The system can generate a query response that comprises the group of identifiers. The system can send a message to the device according to the representational state transfer protocol, wherein the message comprises the query response. The system can receive, from the device, a second request that indicates executing a stored procedure that corresponds to a first identifier of the group of identifiers. The system can, in response to receiving the second request, execute the stored procedure.

An example method can comprise receiving, by a system comprising a processor and from a device, a query request that identifies a uniform resource locator to a resource. The method can further comprise determining, by the system, a group of identifiers that are related to the resource, wherein the determining is performed based on a group of join operations on a group of databases, wherein the determining is performed based on the query request and without reference to another query request, wherein respective identifiers of the group of identifiers comprise respective uniform resource locators to the respective identifiers, and wherein the respective uniform resource locators are consistent across resource types and query requests. The method can further comprise generating, by the system, a query response that comprises the group of identifiers. The method can further comprise sending, by the system, the query response to the device.

An example non-transitory computer-readable medium can comprise instructions that, in response to execution, cause a system comprising a processor to perform operations. These operations can comprise receiving, from a device, a query request that identifies a uniform resource locator to a resource. These operations can further comprise determining a group of identifiers that are related to the resource, wherein respective identifiers of the group of identifiers comprise respective uniform resource locators to the respective identifiers, and wherein the respective uniform resource locators are consistent across resource types and query requests. These operations can further comprise sending a query response that identifies the group of identifiers to the device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example process flow that can facilitate increased efficiency of query types of REST programming interfaces, in accordance with an embodiment of this disclosure;

DETAILED DESCRIPTION

Overview

Figure 1:
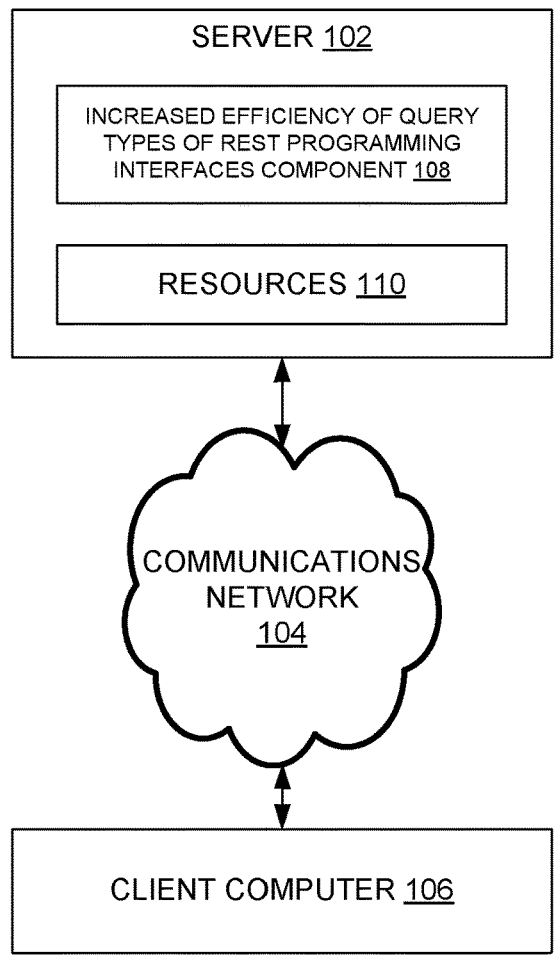
FIG. 1 illustrates an example system architecture that can facilitate increased efficiency of query types of REST programming interfaces, in accordance with an embodiment of this disclosure.

In some examples, accessing configuration data of a computer system using a representational state transfer (REST) programming interface can result in employing multiple REST query requests, such as, "GET resource A, then from A GET resource B, then from resource B GET resource C, and so on until all required configuration data is retrieved. Moreover, in some examples, a query response can contain—by default—all properties of a given resource.

A problem can result from an excessive number of REST invocations and lengthy response contents, which can significantly negatively impact performance due to network transmission latency. An improvement to this problem can relate to replacing a series of query request invocations by a single request invocation, which can avoid returning unnecessary data contents, and thereby improve performance.

Excessive number of REST invocations and lengthy response contents can significantly impact performance due to network transmission latency. Replacing a series of query request invocations by a single request invocation and avoiding returning unnecessary data contents can effectively improve performance.

Some prior techniques use a GraphQL data query and manipulation language for application programming interfaces. It can be that GraphQL does not rely on a specific backend database technology. GraphQL can generally comprise a query language for a web application programming interface (API), and a server-side runtime for executing queries using a type system that users define for their data. Users can then create a GraphQL service by defining types and fields on those types, as well as by providing functions for each field on each type. Users can define client requests to return an exact set of types and an exact set of fields of each type. That is, a GraphQL query can be processed as if a client were requesting a query across many tables, and through using JOIN operations in Structured Query Language (SQL) terminology).

In an example, a user has defined a Book type and an Author type. Then, the user can specify a query client request for the service to return a title of a book, given an International Standard Book Number (ISBN) number and name of author(s) of the book. The service can effectively perform a JOIN operation, retrieving a title from the Book and lookup names of Authors that are associated with that Book record.

Such a request can take the following form:

```
{
  book(isbn: "0000000000000") {
    title authors {
      name
    }
  }
}
```

A corresponding response can take the following form:

```
{
  book: {
    title: "<Book Title>",
    authors: [
      { name: 'John Doe'},
      { name: 'Jane Doe' },
    ]
  }
}
```

A GraphQL query can be implemented as a POST request to provide a request body. In other examples, a SOQL query can be used, where a SOQL statement can be passed in a uniform resource locator (URL) query parameter.

An example SOQL REST query request can be as follows:
  curl    https://yourInstance.example.com/services/data/
     v53.0/query/?q=SELECT+name+from    +Account-H
     "Authorization: Bearer token"

In other examples, URL parameters such as filter, select, and an order can be specified, which, in effect, can specify a query across multiple tables via JOINs. An example of this approach is as follows:
  GET/rest/v1/shares?select=name,filesystem    id(name,
     free_size)&filter=filesystem(name) like doc In this example, the REST query (GET) request above specifies to lookup name of shares from the filesystem where name contains a substring "doc", and lookup the name and free_size of the corresponding filesystem.

A problem with these approaches can be one of complexity. That is, these prior approaches can be based on a concept of JOIN operations, and users can be required to understand the resource model involved—e.g., types, fields, or tables and columns in SQL terminology.

For a non-trivial cloud service resource hierarchy, formulating a multi-level nested query statement can be a complex task. It can be difficult to formulate the query statement, and also difficult to maintain the query statement. If users break a heavily nested query statement into multiple less-complex nested query statements, then that returns to the network latency performance problem previously discussed.

A solution to these problems can involve including consistent, predictable, and useful URL links to identifiers to help users navigate to information they need. A response can include choices of transformation options that users can select to specify an exact set of data contents they desire, without needing to specify nested query statements. The response body can include URL links to pertinent resource material types and fields (e.g., resource model schema) to make information readily available to users should they decide to formulate a query statement.

The response can also include choices of transformation options users can select to specify the exact set of data contents they need without needing to specify nested query statements. Finally, the response body can include URL links to pertinent resource model types and fields (i.e., resource model schema) to make the information readily available to users should they decide to formulate a query statement.

The following example illustrates how to perform a nested JOIN from one query statement (here, a GET query). Take, GET/rest/v1/assets/<id>?select=id,compute-component_id(id,dcm-client id(id),internal-endpoint id(id,reference))

This query statement specifies an asset with a unique asset identifier whose value must be <id>; then selects a compute-component that is associated to the asset; then selects a dem_client that is associated to the selected compute-component; then selects an internal-endpoint that is associate to the dem-client; then returns the identifier of the asset, the identifier of the compute-component, the identifier of the dem-client, the identifier of the internal-endpoint, and the reference value of the internal-endpoint. This query statement can involve a JOIN of an assets table, a compute-component table, a dcm-client table, and an internal-endpoint table.

In some examples, the present techniques can leverage a stored procedure to facilitate this approach in a different way.

The following example can illustrate these techniques. A request can be:

GET/account/12345

The response body can contain properties of a specified account as expected, and also include a list actions and corresponding URL links to related actions that are needed for the specified actions:

```
<account>
    <account_number>12345</account_number>
    <balance currency="usd">100.00</balance>
    <link rel="deposit" href="/account/12345/deposit" />
    <link rel="withdraw" href="/account/12345/withdraw" />
    <link rel="transfer" href="/account/12345/transfer" />
    <link rel="close" href="/account/12345/close" />
</account>
```

One approach according to the present techniques can involve returning URL links of identifiers. To facilitate return links being useful, each response body can include links that are consistent across resource types, are consistent across query requests, and follow common usage patterns across resource types. Types of resource URL links can be similar to the following example.

In this example, a query response can include links of identifiers for an asset 12345 resource in the resource hierarchy:

```
links: {
    "parent": "/subscription/1234",
    "child": ["/memory/111", "cpu/222", "sdd/333"],
    "siblings": ["/assets/22345", "/assets/33456"]
}
```

Links of other relationships can be included. These relationships can be containment relationships, dependency relationships, requirement relationships, etc.

Another approach according to the present techniques can involve returning URL links of a collection of predefined query functions. A query response for a given resource type can contain URL links of predefined, multi-level nested query statements per returning URL links of identifiers, as above. Users can choose a suitable query statement and pass it to a service using a specified URL parameter to retrieve desired data.

To ease a burden on developers, a responsibility of formulating nested reference query statements can be shifted from a client side to a service side. Except, rather than just related links, the response message body from a resource query can return a list of procedure names that represent a set of contextually relevant pre-defined data-retrieval query statements. Here, work can be initiated at a service level, rather than by a database, and can be implemented in a service, with additional data-retrieval query statements, stored procedures, or combinations thereof.

An advantage of this approach can be that it can allow users to locate and perform sophisticated query functions efficiently, and without needing to learn an underlying resource model, which can be complex. Developers can run a predefined procedure by sending a POST request to the resource's "execute" action. An example URL can be, "/<resource>/<id>/execute."

An example of using a predefined procedure is as follows. An initial response message with links to predefined procedures of a query request can be:

```
{
    "links" : {
        "name" : "resource-1",
        "id" : 1,
        "procedures" : [
            {
                "proceduure_1" : {
                    "parameters" : [
                        "property_1",
                        {
                            "resource-2" : {
                                "parameters" : [ "property_2" ]
                            }
                        }
                    ]
                }
            }
        ]
    }
}
```

Then, using data from initial request, a pre-defined procedure can be executed, such as:

POST/rest/v1/<resource>/<id>/
    execute?procedure_1=property_1,resource-2(property_2)-H "Authorization: Bearer token"

This statement can ask to execute the predefined procedure "procedure_1" with respect to an instance <id> of a <resource> type, using two input parameters: property_1 of the resource instance, and property_2 of a resource-2 that is referenced by resource-1.

Another approach according to the present techniques can involve returning URL links of the resource model schema. For users who decided to formulate a custom query statement, it can be that they will need to know the schema of the resource model. Returning a link in query response body can save users effort to look up an up-to-date schema. Additional links can provide user schema of related resource of a given resource and pertinent query statement examples.

Another approach according to the present techniques can involve returning URL links of API documentation. In addition to a URL link to the APIs in general which users might already have, returning URL links of API documentation of the current resource and identifiers can provide API information pertinent to the current and identifiers.

The present techniques can be implemented to provide consistent, predictable, and useful URL links to identifiers data; and/or a collection of URL links to predefined, multi-level nested query statements, which can save user effort and time to retrieve such data via a series of query requests or via complex, multi-level nested statement query request. This is not offered by prior approaches.

The present techniques can also be implemented to include URL links to resource model schema and query API examples pertinent to a given resource in a response body or its identifiers. While some prior approaches have dedicated APIs to retrieve API documentations, they do not include such links in response messages.

In some example scenarios, the resource relationships include the likes of hierarchical relationships, containment relationships, etc. Hence, when a user queries for a given resource, with query parameters that refer to other identifiers, a response can return data of the specified resource and identifiers, and also return uniform resource locators of other identifiers such as parent resources, child resources, sibling resources, etc., that users can be interested in.

In some examples, a query response can return a list of uniform resource locators of stored procedures that can be applied to the specified resource to return identifiers data or to perform state changes to this resource or identifiers. These stored procedures can contain complex nested JOIN query statements that can otherwise be hard to express using HTTP query parameters.

Example Architectures

FIG. 1 illustrates an example system architecture 100 that can facilitate increased efficiency of query types of REST programming interfaces, in accordance with an embodiment of this disclosure.

System architecture 100 comprises server 102, communications network 104, and client computer 106. In turn, server 102 comprises increased efficiency of query types of REST programming interfaces component 108, and resources 110.

Each of server 102 and/or client computer 106 can be implemented with part(s) of computing environment 1300 of FIG. 13. Communications network 104 can comprise a computer communications network, such as the Internet.

Increased efficiency of query types of REST programming interfaces component 108 can expose a REST API endpoint. Client computer 106 can send a REST query to server 102 via communications network 104. This REST query can identify a resource of resources 110 (which can be computer resources, such as those shown with respect to system architecture 200 of FIG. 2). Increased efficiency of query types of REST programming interfaces component 108 can process this REST query and send a response to client computer 106 via communications network 104.

Figure 8:
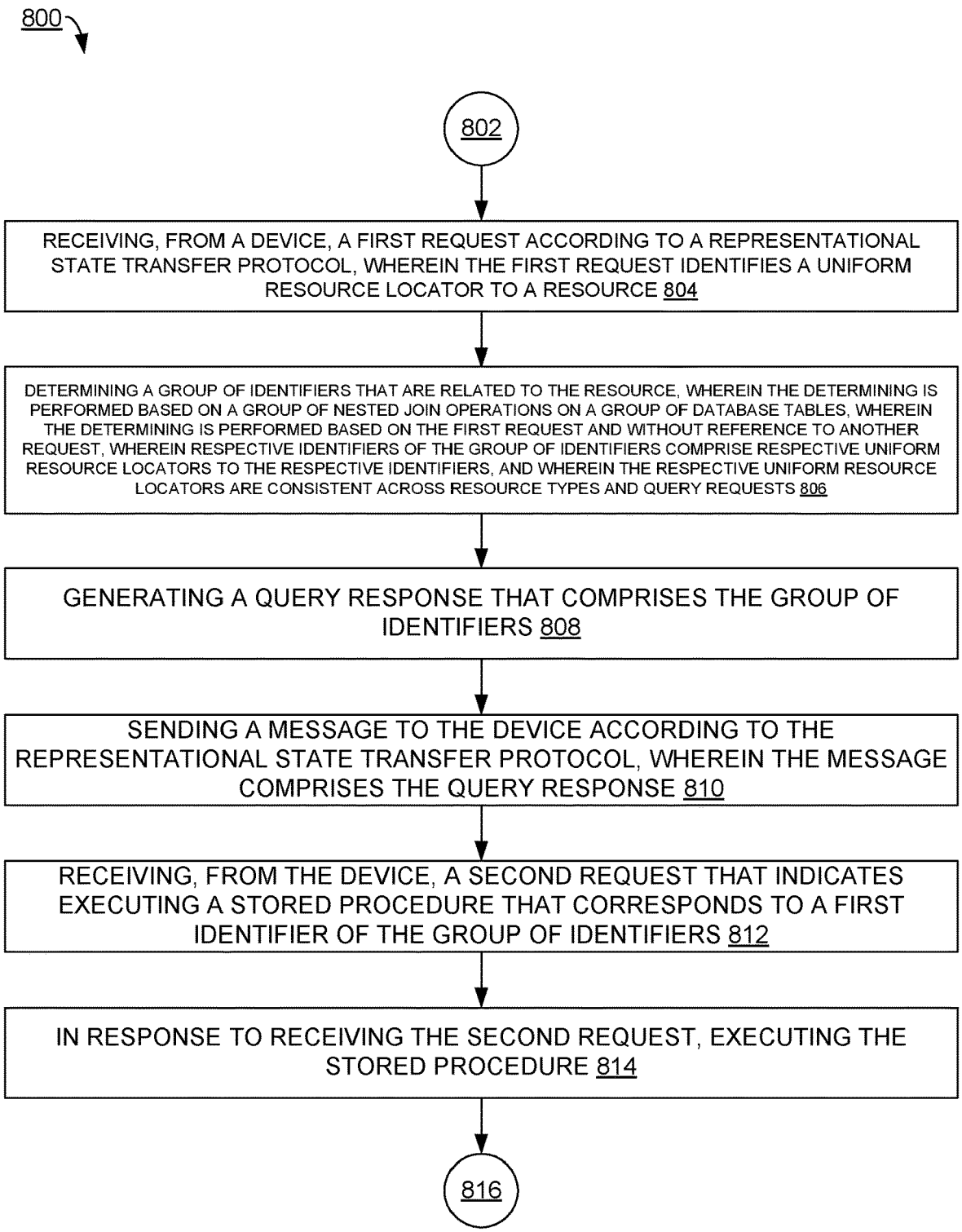
FIG. 8 illustrates an example process flow that can facilitate increased efficiency of query types of REST programming interfaces, in accordance with an embodiment of this disclosure.
Figure 10:
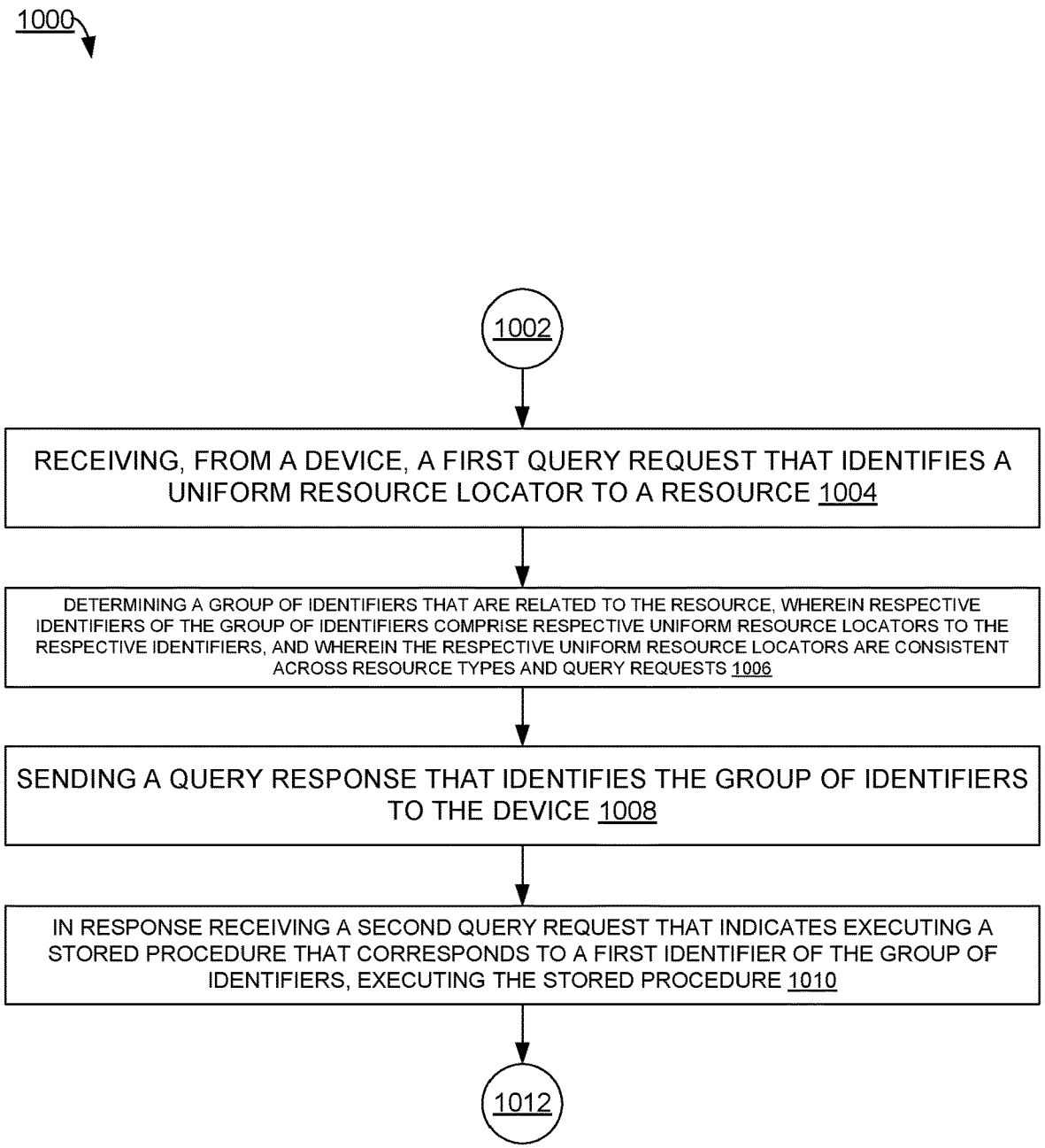
FIG. 10 illustrates another example process flow that can facilitate increased efficiency of query types of REST programming interfaces, in accordance with an embodiment of this disclosure.

In some examples, increased efficiency of query types of REST programming interfaces component 108 can implement part(s) of the process flows of FIGS. 8-10 to implement increased efficiency of query types of REST programming interfaces.

It can be appreciated that system architecture 100 is one example system architecture for increased efficiency of query types of REST programming interfaces, and that there can be other system architectures that facilitate increased efficiency of query types of REST programming interfaces.

Figure 2:
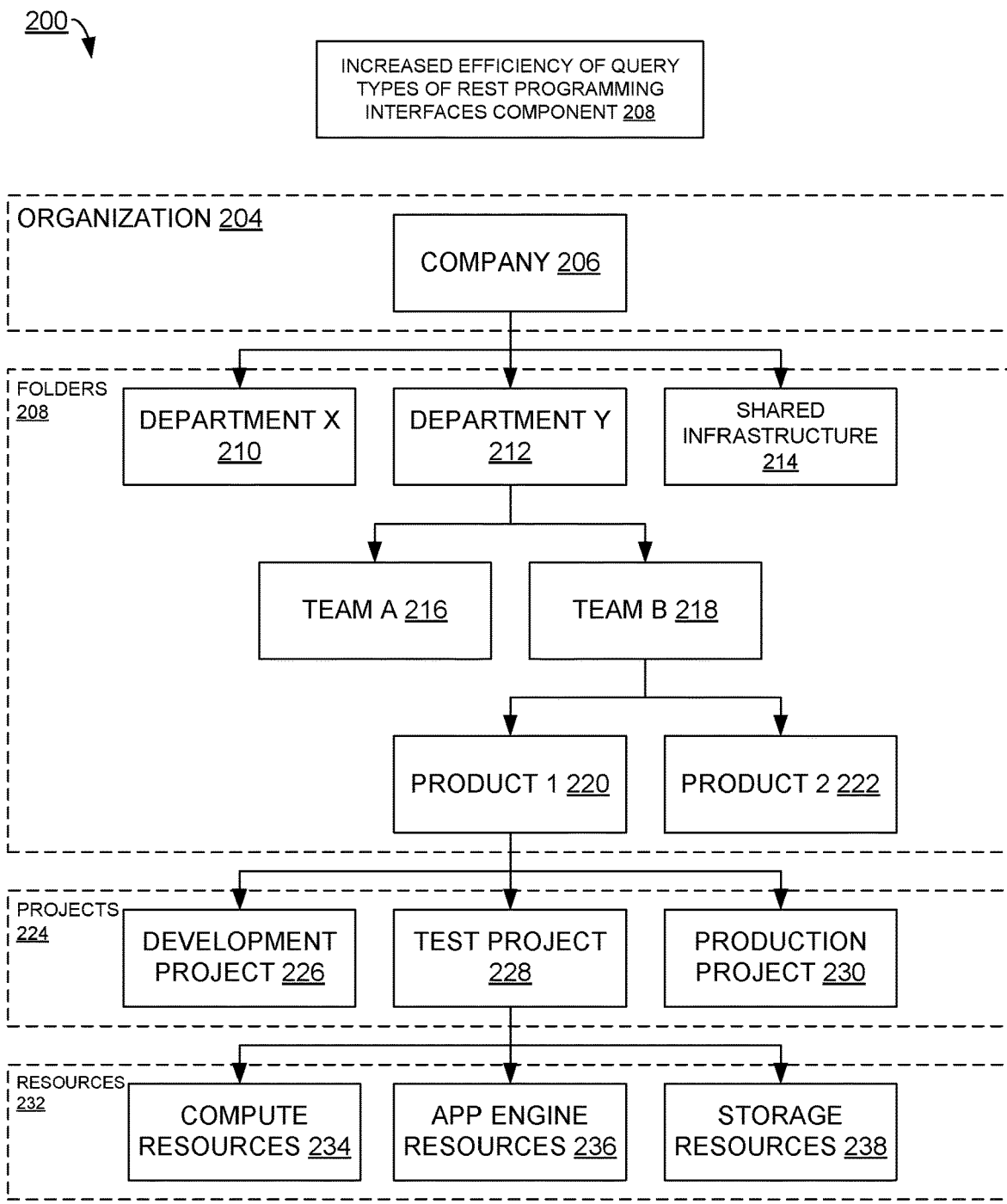
FIG. 2 illustrates another example system architecture that can facilitate increased efficiency of query types of REST programming interfaces, in accordance with an embodiment of this disclosure.

FIG. 2 illustrates another example system architecture 200 that can facilitate increased efficiency of query types of REST programming interfaces, in accordance with an embodiment of this disclosure. In some examples, part(s) of system architecture 200 can be implemented with part(s) of system architecture 100 of FIG. 1 to facilitate increased efficiency of query types of REST programming interfaces.

System architecture 200 comprises increased efficiency of query types of REST programming interfaces component 202 (which can be similar to increased efficiency of query types of REST programming interfaces component 108 of FIG. 1), and a resource hierarchy that comprises organization 204, folders 208, projects 224, and resources 232. Within organization 204, folders 208, projects 224, and resources 232 are company 206, department X 210, department Y 212, shared infrastructure 214, team A 216, team B 218, product 1 220, product 2 222, development project 226, test project 228, production project 230, compute resources 234, app engine resources 236, and storage resources 238.

These components can represent a resource hierarchy for a cloud computing service. According to prior techniques, multiple REST query requests could be made to retrieve information about this resource hierarchy, e.g., "GET resource A, then from A GET resource B, then from resource B GET resource C, and so on until all required configuration data are retrieved."

According to the present techniques, increased efficiency of query types of REST programming interfaces component 202 can process one REST query request and provide as a query response the entire hierarchy. This can be similar as illustrated in system architecture 400 of FIG. 4.

Figure 3:
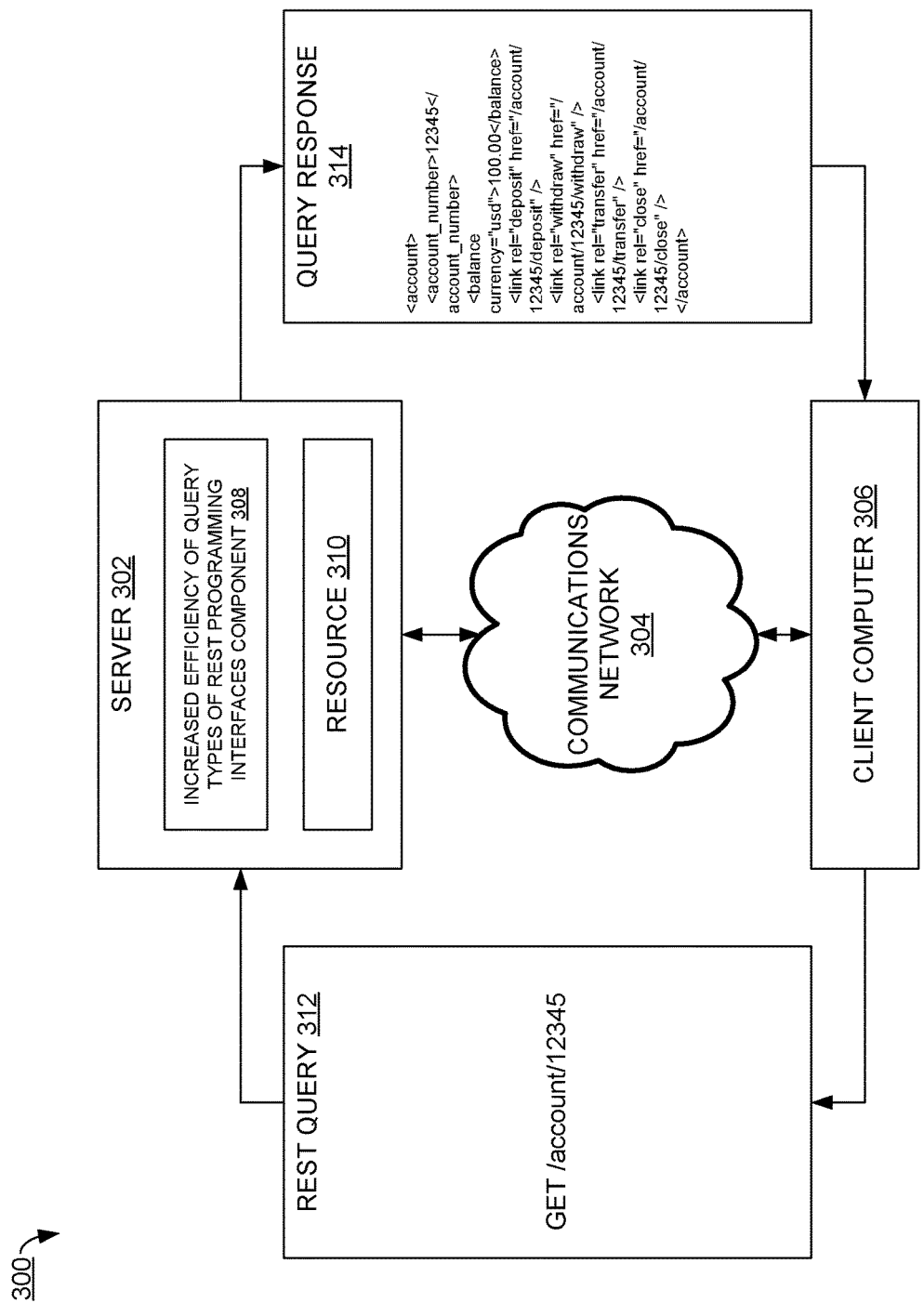
FIG. 3 illustrates another example system architecture that can facilitate increased efficiency of query types of REST programming interfaces, in accordance with an embodiment of this disclosure.

FIG. 3 illustrates another example system architecture 300 that can facilitate increased efficiency of query types of REST programming interfaces, in accordance with an embodiment of this disclosure. In some examples, part(s) of system architecture 300 can be implemented with part(s) of system architecture 100 of FIG. 1 to facilitate increased efficiency of query types of REST programming interfaces.

System architecture 300 comprises server 302, communications network 304, client 306, increased efficiency of query types of REST programming interfaces component 308, and resources 310. These components can be similar to server 102, communications network 104, client computer 106, increased efficiency of query types of REST programming interfaces component 108, and resources 110 of FIG. 1, respectively.

System architecture 300 also comprises REST query 312 and query response 314. Client 306 sends REST query 312 to increased efficiency of query types of REST programming interfaces component 308, via communications network 304. REST query 312 indicates a request to get information for account 12345: "GET/account/12345."

Increased efficiency of query types of REST programming interfaces component 308 can process REST query 312, generate query response 314, and send query response 314 to client 306 via communications network 304. Query response 314 can comprise information about account 12345, including a current balance, and links to invoke stored procedures (e.g., to make a deposit or a withdrawal). Increased efficiency of query types of REST programming interfaces component 308 generate query response 314 as a POST message. Query response 314 can take the form of:

```
<account>
    <account_number>12345</account_number>
    <balance currency="usd">100.00</balance>
    <link rel="deposit" href="/account/12345/deposit" />
    <link rel="withdraw" href="/account/12345/withdraw" />
    <link rel="transfer" href="/account/12345/transfer" />
    <link rel="close" href="/account/12345/close" />
</account>
```

A GET request and a POST request can generally comprise types of hypertext transfer protocol (HTTP) requests. A GET request can generally append request parameters to a uniform resource locator (URL)—e.g., example.com/command.php?<parameters>. A POST request can generally write parameters within a HTTP request.

Figure 4:
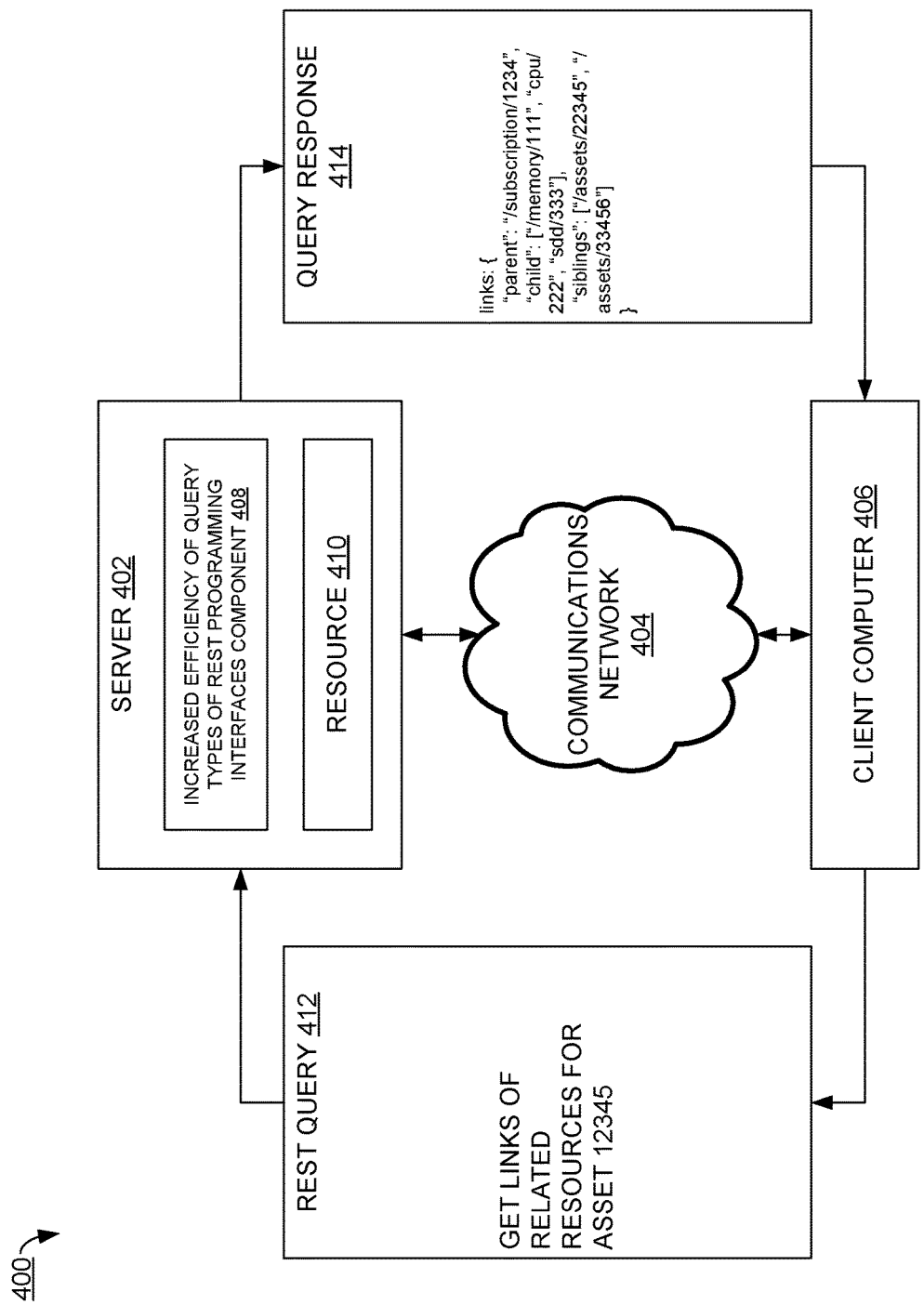
FIG. 4 illustrates another example system architecture that can facilitate increased efficiency of query types of REST programming interfaces, in accordance with an embodiment of this disclosure.

FIG. 4 illustrates another example system architecture 400 that can facilitate increased efficiency of query types of REST programming interfaces, in accordance with an embodiment of this disclosure. In some examples, part(s) of system architecture 400 can be implemented with part(s) of system architecture 100 of FIG. 1 to facilitate increased efficiency of query types of REST programming interfaces.

System architecture 400 comprises server 402, communications network 404, client 406, increased efficiency of query types of REST programming interfaces component 408, and resources 410. These components can be similar to server 102, communications network 104, client computer 106, increased efficiency of query types of REST programming interfaces component 108, and resources 110 of FIG. 1, respectively.

System architecture 400 also comprises REST query 412 and query response 414. Client 406 sends REST query 412 to increased efficiency of query types of REST programming interfaces component 408, via communications network 404. REST query 412 indicates a request to get links of identifiers for an asset 12345 resource in a resource hierarchy.

Query response 414 can then contain a response to REST query 412:

```
links: {
   "parent": "/subscription/1234",
   "child": ["/memory/111", "cpu/222", "sdd/333"],
   "siblings": ["/assets/22345", "/assets/33456"]
}
```

Figure 5:
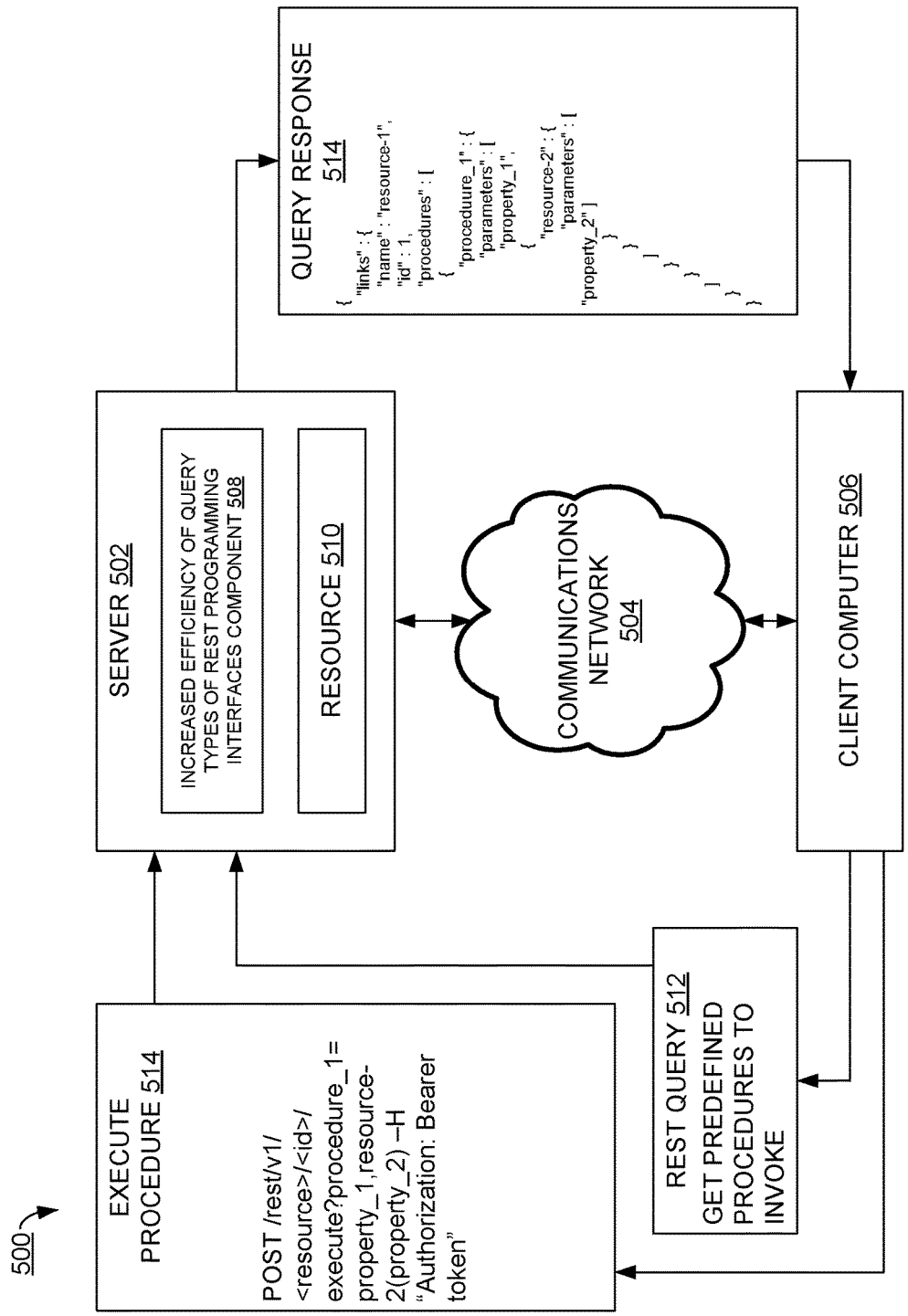
FIG. 5 illustrates another example system architecture that can facilitate increased efficiency of query types of REST programming interfaces, in accordance with an embodiment of this disclosure.

FIG. 5 illustrates another example system architecture 500 that can facilitate increased efficiency of query types of REST programming interfaces, in accordance with an embodiment of this disclosure. In some examples, part(s) of system architecture 500 can be implemented with part(s) of system architecture 100 of FIG. 1 to facilitate increased efficiency of query types of REST programming interfaces.

System architecture 500 comprises server 502, communications network 504, client 506, increased efficiency of query types of REST programming interfaces component 508, and resources 510. These components can be similar to server 102, communications network 104, client computer 106, increased efficiency of query types of REST programming interfaces component 108, and resources 110 of FIG. 1, respectively.

System architecture 500 also comprises REST query 512, query response 514, and execute procedure 516. Client 506 sends REST query 512 to increased efficiency of query types of REST programming interfaces component 508, via communications network 504, where REST query 512 indicates a query for predefined procedures to invoke.

Query response 514 can then contain a response to REST query 512, and indicate predefined procedures that client 506 can invoke:

```
{
   "links" : {
      "name" : "resource-1",
      "id" : 1,
      "procedures" : [
         {
            "proceduure_1" : {
               "parameters" : [
                  "property_1",
                  {
                     "resource-2" : {
                        "parameters" : [ "property_2" ]
                     }
                  }
               ]
            }
         }
      ]
   }
}
```

Using the information in query response 514, client 506 can invoke a predefined procedure with execute procedure 516: POST/rest/v1/<resource>/<id>/execute?procedure_1=property_1,resource-2(property_2)-H "Authorization: Bearer token"

Execute procedure 516 asks to execute the predefined procedure "procedure_1" with respect to an instance <id> of a <resource> type, using two input parameters: property_1 of the resource instance, and property_2 of a resource-2 that is referenced by resource-1.

Figure 6:
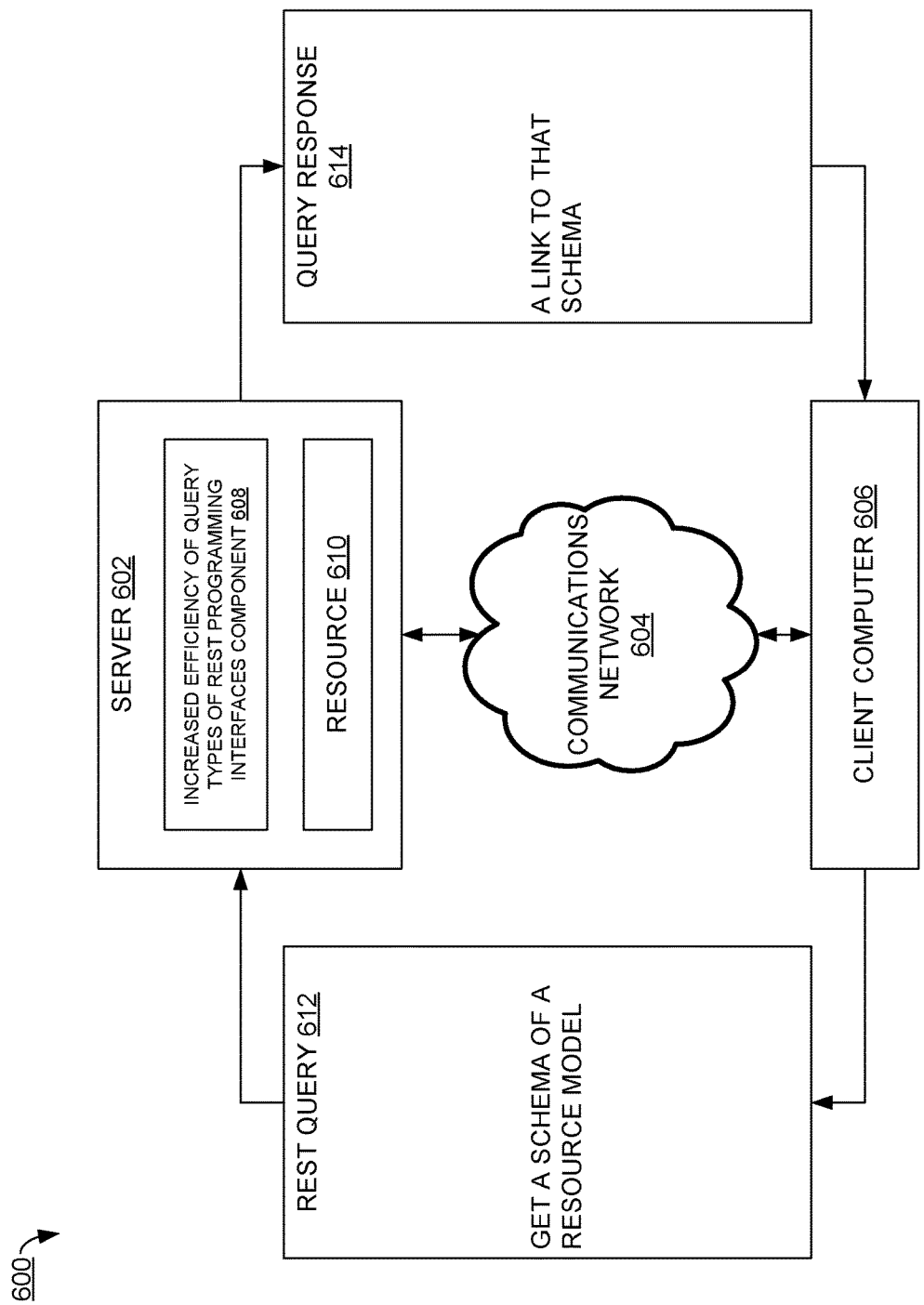
FIG. 6 illustrates another example system architecture that can facilitate increased efficiency of query types of REST programming interfaces, in accordance with an embodiment of this disclosure.

FIG. 6 illustrates another example system architecture 600 that can facilitate increased efficiency of query types of REST programming interfaces, in accordance with an embodiment of this disclosure. In some examples, part(s) of system architecture 600 can be implemented with part(s) of system architecture 100 of FIG. 1 to facilitate increased efficiency of query types of REST programming interfaces.

System architecture 600 comprises server 602, communications network 604, client 606, increased efficiency of query types of REST programming interfaces component 608, and resources 610. These components can be similar to server 102, communications network 104, client computer 106, increased efficiency of query types of REST programming interfaces component 108, and resources 110 of FIG. 1, respectively.

System architecture 600 also comprises REST query 612 and query response 614. Client 606 sends REST query 612 to increased efficiency of query types of REST programming interfaces component 608, via communications network 604.

REST query 612 can indicate a request for a schema of a resource model. Query response 614 can then contain a response to REST query 612, and indicate a link to that schema. In some examples, query response 614 can include links to schema of identifiers to the requested resource, and/or query statement examples for the schema.

Figure 7:
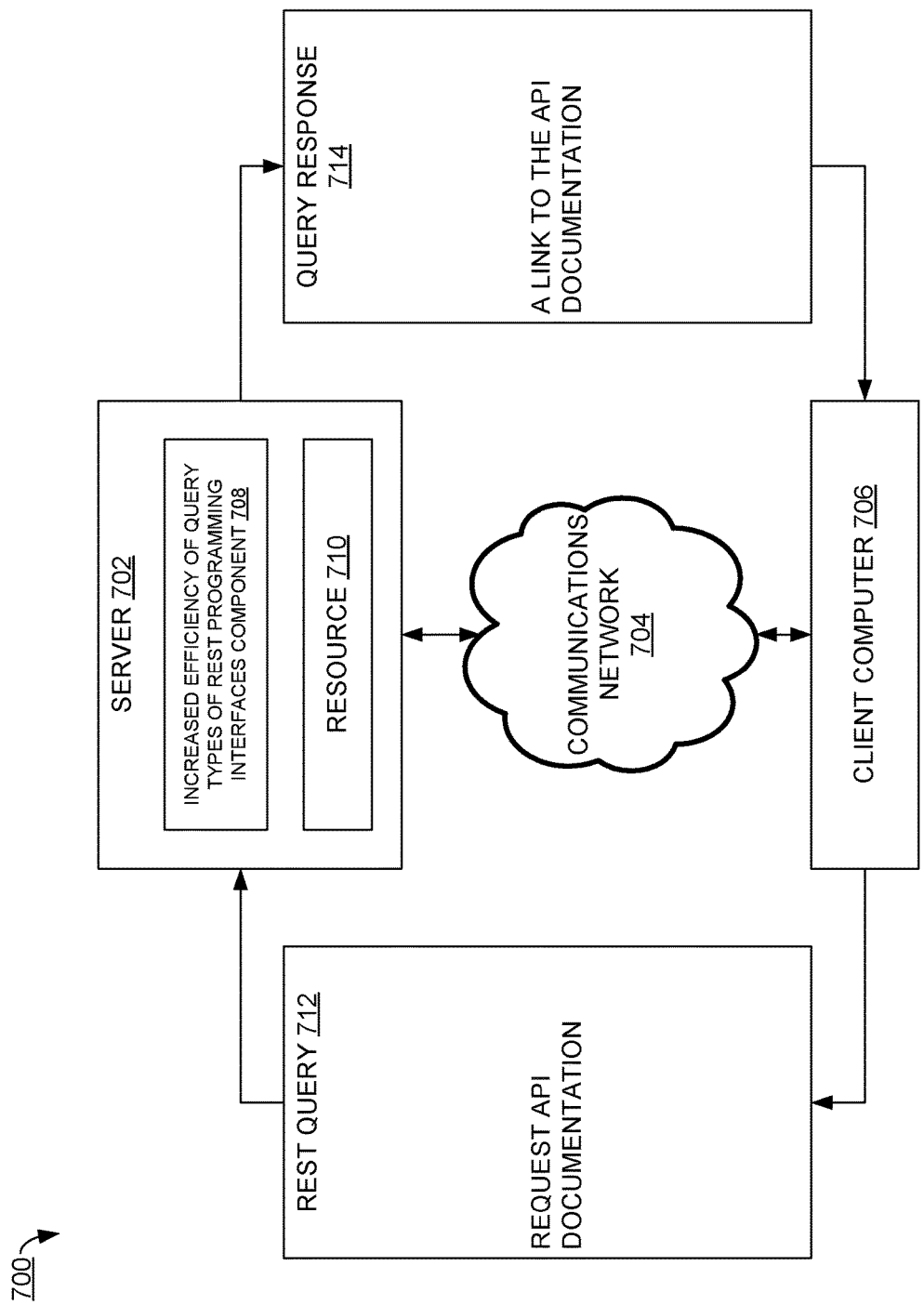
FIG. 7 illustrates another example system architecture that can facilitate increased efficiency of query types of REST programming interfaces, in accordance with an embodiment of this disclosure.

FIG. 7 illustrates another example system architecture 700 that can facilitate increased efficiency of query types of REST programming interfaces, in accordance with an embodiment of this disclosure. In some examples, part(s) of system architecture 700 can be implemented with part(s) of system architecture 100 of FIG. 1 to facilitate increased efficiency of query types of REST programming interfaces.

System architecture 700 comprises server 702, communications network 704, client 706, increased efficiency of query types of REST programming interfaces component 708, and resources 710. These components can be similar to server 102, communications network 104, client computer 106, increased efficiency of query types of REST programming interfaces component 108, and resources 110 of FIG. 1, respectively.

System architecture 700 also comprises REST query 712 and query response 714. Client 706 sends REST query 712 to increased efficiency of query types of REST programming interfaces component 708, via communications network 704.

REST query 712 can indicate a request for API documentation. Query response 714 can then contain a response to REST query 712, and indicate a link to that API documentation. In some examples, query response can include links to API information pertinent to the current resource and identifiers.

Example Process Flows

FIG. 8 illustrates an example process flow 800 that can facilitate increased efficiency of query types of REST programming interfaces, in accordance with an embodiment of this disclosure. In some examples, one or more embodiments of process flow 800 can be implemented by increased efficiency of query types of REST programming interfaces component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts receiving, from a device, a first request according to a representational state transfer protocol, wherein the first request identifies a uniform resource locator to a resource. That is, increased efficiency of query types of REST programming interfaces component 108 of FIG. 1 can receive a GET request from client computer 106, where the GET request identifies a resource hosted by server 102.

In some examples, operation 804 can comprise receiving, from a device, a GET request according to a representational state transfer protocol, wherein the GET request identifies a uniform resource locator to a resource, and zero or more query parameters that can identify identifiers and their attributes.

After operation 804, process flow 800 moves to operation 806.

Operation 806 depicts determining a group of identifiers that are related to the resource, wherein the determining is performed based on a group of nested join operations on a group of database tables, wherein the determining is performed based on the first request and without reference to another request, wherein respective identifiers of the group of identifiers comprise respective uniform resource locators to the respective identifiers, and wherein the respective uniform resource locators are consistent across resource types and query requests. That is, increased efficiency of query types of REST programming interfaces component 108 of FIG. 1 can determine identifiers for the resource of operation 804, where URLs for these identifiers are consistent across resource types and query results, and where JOIN operations are performed to generate a query response, even though a GET request was received (as opposed to a request to directly perform a series of specified JOIN operations).

In some examples, the resource is a first resource, the group of identifiers comprises a second resource, and the second resource is related to the first resource via a parent relationship. A parent relationship can be identified such as in query response 414 of FIG. 4.

In some examples the resource is a first resource, the group of identifiers comprises a second resource, and the second resource is related to the first resource via a child relationship. A child relationship can be identified such as in query response 414 of FIG. 4.

In some examples, the resource is a first resource, the group of identifiers comprises a second resource, and the second resource is related to the first resource via a sibling relationship. A sibling relationship can be identified such as in query response 414 of FIG. 4.

In some examples, the resource is a first resource, the group of identifiers comprises a second resource, and the second resource is related to the first resource via a containment relationship. A containment relationship can generally comprise a scenario where one resource serves as a container and another resource serves as contents within that container.

In some examples, the resource is a first resource, the group of identifiers comprises a second resource, and the second resource is related to the first resource via a dependency relationship. A containment relationship can generally comprise a scenario where one resource depends on another resource.

In some examples, the resource is a first resource, the group of identifiers comprises a second resource, and the second resource is related to the first resource via a requirement relationship. A requirement relationship can generally comprise a scenario where one resource requires the existence of another resource to function.

In some examples, operation 806 can comprise determining a group of identifiers that are related to the resource as specified by the query parameters, wherein the determining is performed based on a group of nested join operations on a group of database tables, wherein the determining is performed based on the GET request and without reference to another GET request, wherein respective identifiers of the group of identifiers comprise respective uniform resource locators to the respective identifiers, and wherein the respective uniform resource locators are consistent across resource types and query requests.

In some examples, operation 806 comprises determining a group of identifiers for the resource, wherein the determining is performed based on a group of nested join operations on a group of database tables, documents, or other type of objects, wherein the determining is performed based on the GET request and without reference to another GET request, wherein respective identifiers of the group of identifiers comprise respective uniform resource locators to the respective identifiers, and wherein the respective uniform resource locators are consistent across resource types and query requests.

After operation 806, process flow 800 moves to operation 808.

Operation 808 depicts generating a query response that comprises the group of identifiers. That is, increased efficiency of query types of REST programming interfaces component 108 of FIG. 1 can generate a query response that identifies the group of identifiers from operation 806.

In some examples, operation 808 can comprise generating a query response that comprises the group of identifiers, wherein the query response comprises additional resource locators to resources that are related to the specified resource that most users are interested in, wherein the query response comprises additional resource locators of predefined stored procedures that can be applied to the specified resource and identifiers either to perform complex nested join queries or to perform state changes.

In some examples, the system can determine a list of one or more identifiers of pre-defined executable procedures that are related to the resource. Each procedure can comprise contextually-relevant, pre-defined, data-retrieval query statements, data management statements, and other statements. The system can execute a procedure upon receiving a message from the device according to the representational state transfer protocol, wherein the message can comprise an identifier of a procedure and zero or more input parameters to the procedure.

After operation 808, process flow 800 moves to operation 810.

Operation 810 depicts sending a message to the device according to the representational state transfer protocol, wherein the message comprises the query response. That is, increased efficiency of query types of REST programming interfaces component 108 of FIG. 1 can then send an indication of these identifiers to client computer 106 using a message.

In some examples, operation 810 can comprise sending a message to the device according to the representational state transfer protocol to specify a stored procedure with input parameters, wherein the message comprises the query response or a state change response.

In some examples, operation 810 comprises determining a list of pre-defined executable procedures related to the resource. One or more of the procedures can be executed by the system when receiving a POST message to the device according to the representational state transfer protocol, wherein the POST message comprises the identifier of the procedure to be executed and a set of zero or more input parameters.

In some examples, the message can comprise a related uniform resource locator and parameters that are specified by a selected link item.

After operation 810, process flow 800 moves to operation 812.

Operation 812 depicts receiving, from the device, a second request that indicates executing a stored procedure that corresponds to a first identifier of the group of identifiers. In some examples, this can be a POST request. That is, the device can receive identifiers from the system, and these identifiers can include identifiers of stored procedures that the system can execute. The device can create a second request to invoke one of these stored procedures.

After operation 812, process flow 800 moves to operation 814.

Operation 814 depicts, in response to receiving the second request, executing the stored procedure. This can comprise executing the stored procedure identified by the second request in operation 812.

After operation 814, process flow 800 moves to 816, where process flow 800 ends.

FIG. 9 illustrates an example process flow 900 that can facilitate increased efficiency of query types of REST programming interfaces, in accordance with an embodiment of this disclosure. In some examples, one or more embodiments of process flow 900 can be implemented by increased efficiency of query types of REST programming interfaces component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts receiving a first query request that identifies a uniform resource locator to a resource. In some examples, operation 904 can be implemented in a similar manner as operation 804 of FIG. 8. In some examples, the first query request comprises a GET request.

After operation 904, process flow 900 moves to operation 906.

Operation 906 depicts determining a group of identifiers that are related to the resource, wherein the determining is performed based on a group of join operations on a group of databases, wherein the determining is performed based on the query request and without reference to another query request, wherein respective identifiers of the group of identifiers comprise respective uniform resource locators to the respective identifiers, and wherein the respective uniform resource locators are consistent across resource types and query requests. In some examples, operation 906 can be implemented in a similar manner as operation 806 of FIG. 8.

After operation 906, process flow 900 moves to operation 908.

Operation 908 depicts generating a query response that comprises the group of identifiers. In some examples, operation 908 can be implemented in a similar manner as operation 808 of FIG. 8.

After operation 908, process flow 900 moves to operation 910.

Operation 910 depicts sending the query response to the device. In some examples, operation 910 can be implemented in a similar manner as operation 810 of FIG. 8.

In some examples, the query response comprises an identifier of a procedure that is configured to be executed, and the procedure comprises a contextually-relevant, pre-defined, data-retrieval query statement. That is, the query response can be similar to query response 514 of FIG. 5.

In some examples, the first response comprises a contextually-relevant, pre-defined, data-retrieval query statement.

In some examples, rather than just related links, the response message body from a resource query can return a list of procedure names that represent a set of contextually relevant pre-defined data-retrieval query statements."

In some examples, the query response is a first message, and operation 910 comprises, in response to receiving a second message that identifies the procedure, executing the procedure. That is, developers can run a pre-defined procedure by sending a POST request to the resource's "execute" action.

In some examples, the resource is a first resource, the uniform resource locator is a first uniform resource locator, and the second message comprises a second uniform resource locator that identifies a second resource that corresponds to the procedure, and an instance of the second resource that corresponds to the procedure. That is, an example URL in this scenario can be "/<resource>/<id>/execute."

In some examples, the second uniform resource locator identifies a third resource that is referenced by the second resource. That is, a POST message can be of the form, POST/rest/v1/<resource>/<id>/
execute?procedure_1=property_1,resource-2(property_2)-H "Authorization: Bearer token".

In some examples, the query response is a first query response, and the second message is formed independently of a resource model of data that is processed during generation of a second query response to the second message. That is, an advantage of this approach can be that it allows users to locate and perform sophisticated query functions efficiently without needing to learn an underlying resource model.

After operation 910, process flow 900 moves to operation 912.

Operation 912 depicts, in response to receiving a second query request that indicates executing a stored procedure that corresponds to a first identifier of the group of identifiers, executing the stored procedure. In some examples, operation 912 can be implemented in a similar manner as operations 810-812 of FIG. 8.

In some examples, the second query request comprises a POST request. In some examples, the second query request comprises a second uniform resource locator that identifies a second resource that corresponds to the stored procedure, and an instance of the second resource that corresponds to the procedure.

In some examples, the query response is a first query response, and the second query request is formed independently of a resource model of data that is processed during generation of a second query response to the second query request.

After operation 912, process flow 900 moves to 914, where process flow 900 ends.

FIG. 10 illustrates an example process flow 1000 that can facilitate increased efficiency of query types of REST programming interfaces, in accordance with an embodiment of this disclosure. In some examples, one or more embodiments of process flow 1000 can be implemented by increased efficiency of query types of REST programming interfaces component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004.

Operation 1004 depicts receiving, from a device, a first query request that identifies a uniform resource locator to a resource. In some examples, operation 1004 can be implemented in a similar manner as operation 804 of FIG. 8.

After operation 1004, process flow 1000 moves to operation 1006.

Operation 1006 depicts determining a group of identifiers that are related to the resource, wherein respective identifiers of the group of identifiers comprise respective uniform resource locators to the respective identifiers, and wherein the respective uniform resource locators are consistent across resource types and query requests. In some examples, operation 1006 can be implemented in a similar manner as operation 806 of FIG. 8.

In some examples, the determining is performed based on a group of join operations on a group of databases, and the determining is performed based on the query request. That is, for one GET request, it can be that multiple JOINs are performed.

After operation 1006, process flow 1000 moves to operation 1008.

Operation 1008 depicts sending a query response that identifies the group of identifiers to the device. In some examples, operation 1008 can be implemented in a similar manner as operations 808-810 of FIG. 8.

In some examples, the query response comprises a schema of a resource model of data that corresponds to the resource. In some examples, the query response comprises a schema of a resource model of data that corresponds to the group of identifiers. In some examples, the query response comprises an indication of an example query statement to query the resource. That is, it can be that, for users who decided to formulate a custom query statement, they will need to know the schema of the resource model. Returning a link in query response body can save users effort to look up an up-to-date schema. Additional links can provide users with schema of related resource of a given resource and pertinent query statement examples.

In some examples, the query response comprises an identification of an application programming interface documentation for the resource. In some examples, the query response comprises an identification of an application programming interface documentation for the group of identifiers. That is, in some examples, in addition to a URL link to APIs in general that users may already have, returning URL links of API documentation of the current resource and identifiers can provide API information pertinent to the current and identifiers.

After operation 1008, process flow 1000 moves to operation 1010.

Operation 1010 depicts, in response receiving a second query request that indicates executing a stored procedure that corresponds to a first identifier of the group of identifiers, executing the stored procedure. In some examples, operation 1010 can be implemented in a similar manner as operations 812-814 of FIG. 8.

After operation 1010, process flow 1000 moves to 1012, where process flow 1000 ends.

Example Operating Environment

Figure 11:
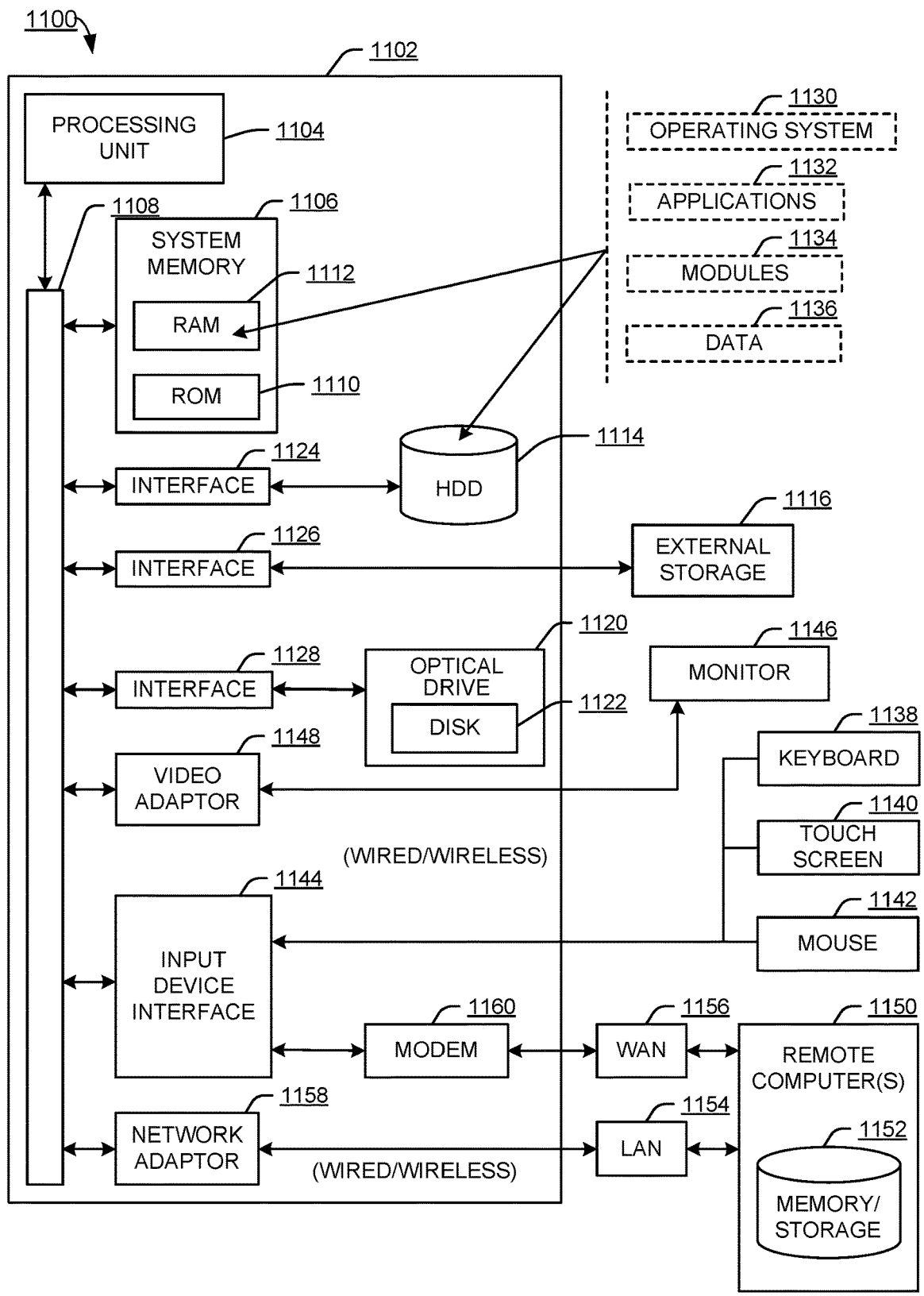
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or client computer 106 of FIG. 1.

In some examples, computing environment 1100 can implement one or more embodiments of the process flows of FIGS. 8-10 to facilitate increased efficiency of query types of REST programming interfaces.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory coupled to the processor, comprising instructions that cause the at least one processor to perform operations comprising:
        receiving, from a device, a first request according to a representational state transfer protocol, wherein the first request identifies a uniform resource locator to a resource;
        determining a group of identifiers that are related to the resource, wherein the determining is performed based on a group of nested join operations on a group of database tables, wherein the determining is performed based on the first request and without reference to another request, wherein respective identifiers of the group of identifiers comprise respective uniform resource locators to the respective identifiers, and wherein the respective uniform resource locators are consistent across resource types and query requests;
        generating a query response that comprises the group of identifiers;
        sending a message to the device according to the representational state transfer protocol, wherein the message comprises the query response;
        receiving, from the device, a second request that indicates executing a stored procedure that corresponds to a first identifier of the group of identifiers; and
        in response to receiving the second request, executing the stored procedure, wherein the second request lacks a requirement to specify nested query statements, and wherein the stored procedure comprises nested join query statements.

2. The system of claim 1, wherein the resource is a first resource, wherein the group of identifiers comprises a second resource, and wherein the second resource is related to the first resource via a parent relationship.

3. The system of claim 1, wherein the resource is a first resource, wherein the group of identifiers comprises a second resource, and wherein the second resource is related to the first resource via a child relationship.

4. The system of claim 1, wherein the resource is a first resource, wherein the group of identifiers comprises a second resource, and wherein the second resource is related to the first resource via a sibling relationship.

5. The system of claim 1, wherein the resource is a first resource, wherein the group of identifiers comprises a second resource, and wherein the second resource is related to the first resource via a containment relationship.

6. The system of claim 1, wherein the resource is a first resource, wherein the group of identifiers comprises a second resource, and wherein the second resource is related to the first resource via a dependency relationship.

7. The system of claim 1, wherein the resource is a first resource, wherein the group of identifiers comprises a second resource, and wherein the second resource is related to the first resource via a requirement relationship.

8. A method, comprising:
receiving, by a system comprising at least one processor and from a device, a first query request that identifies a uniform resource locator to a resource;
determining, by the system, a group of identifiers that are related to the resource, wherein the determining is performed based on a group of join operations on a group of databases, wherein the determining is performed based on the query request and without reference to another query request, wherein respective identifiers of the group of identifiers comprise respective uniform resource locators to the respective identifiers, and wherein the respective uniform resource locators are consistent across resource types and query requests;
generating, by the system, a query response that comprises the group of identifiers;
sending, by the system, the query response to the device; and
in response to receiving a second query request, from the device or another device, that indicates executing a stored procedure that corresponds to a first identifier of the group of identifiers, executing, by the system, the stored procedure, wherein the second query request lacks a requirement to specify nested query statements, and wherein the stored procedure comprises nested join query statements.

9. The method of claim 8, wherein the query response comprises a contextually-relevant, pre-defined, data-retrieval query statement.

10. The method of claim 9, wherein the first query request comprises a GET request.

11. The method of claim 10, wherein the second query request comprises a POST request.

12. The method of claim 9, wherein the second query request comprises a second uniform resource locator that identifies a second resource that corresponds to the stored procedure, and an instance of the second resource that corresponds to the stored procedure.

13. The method of claim 9, wherein the query response is a first query response, and wherein the second query request is formed independently of a resource model of data that is processed during generation of a second query response to the second query request.

14. A non-transitory computer-readable medium comprising instructions that, in response to execution, cause a system comprising a processor to perform operations, comprising:
receiving, from a device, a first query request that identifies a uniform resource locator to a resource;
determining a group of identifiers that are related to the resource, wherein the determining is performed based on a group of nested join operations on a group of database tables, wherein the determining is performed based on the first request and without reference to another request, wherein respective identifiers of the group of identifiers comprise respective uniform resource locators to the respective identifiers, and wherein the respective uniform resource locators are consistent across resource types and query requests, to produce an identified group of identifiers;
sending a query response that comprises the identified group of identifiers to the device; and
in response to receiving a second query request, from the device or another device, that indicates executing a stored procedure that corresponds to a first identifier of the group of identifiers, executing the stored procedure, wherein the second query request lacks a requirement to specify nested query statements, and wherein the stored procedure comprises nested join query statements.

15. The non-transitory computer-readable medium of claim 14, wherein the determining is performed based on a group of join operations on a group of databases, and wherein the identifying is performed based on the query request.

16. The non-transitory computer-readable medium of claim 14, wherein the query response comprises a schema of a resource model of data that corresponds to the resource.

17. The non-transitory computer-readable medium of claim 14, wherein the query response comprises a schema of a resource model of data that corresponds to the group of identifiers.

18. The non-transitory computer-readable medium of claim 14, wherein the query response comprises an indication of an example query statement to query the resource.

19. The non-transitory computer-readable medium of claim 14, wherein the query response comprises an identification of an application programming interface documentation for the resource.

20. The non-transitory computer-readable medium of claim 14, wherein the query response comprises an identification of an application programming interface documentation for the group of identifiers.

\* \* \* \* \*